United States Patent [19]
Lodge

[11] 4,454,765
[45] Jun. 19, 1984

[54] EXTENDED RANGE PRESSURE TRANSDUCERS

[76] Inventor: Arthur S. Lodge, 210 DuRose Ter., Madison, Wis. 53705

[21] Appl. No.: 317,604

[22] Filed: Nov. 3, 1981

[51] Int. Cl.³ .............................................. G01L 9/12
[52] U.S. Cl. ........................................ 73/724; 73/756
[58] Field of Search ............... 73/724, 730, 718, 756, 73/431; 361/283

[56] References Cited

U.S. PATENT DOCUMENTS

| | | | |
|---|---|---|---|
| 4,141,252 | 2/1979 | Lodge | 73/724 |
| 4,310,906 | 1/1982 | Cantrell | 361/283 |

*Primary Examiner*—Donald O. Woodiel
*Attorney, Agent, or Firm*—Burmeister, York, Palmatier, Hamby & Jones

[57] ABSTRACT

The useful range of the disclosed pressure transducers is extended by isolating the sensing means of the transducer from bending moments produced in the transducer body by the fluid pressure being measured. The isolating means may comprise an isolating ring interposed between the body and the sensor means, disposed behind a diaphragm which is attached to the isolating ring and the body. The isolating ring is connected to the body by means adapted to hold the sensor means in an established relationship with the diaphragm while being of a character to avoid transmitting bending moments, whereby the isolating ring and the sensor means are isolated from bending moments developed in the body due to fluid pressure.

25 Claims, 5 Drawing Figures

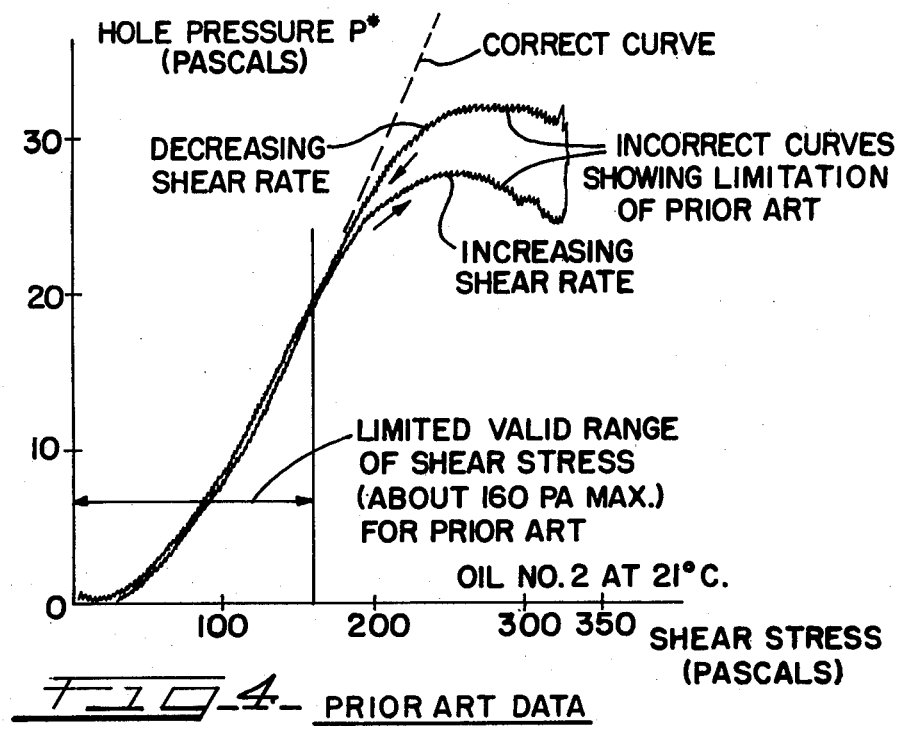
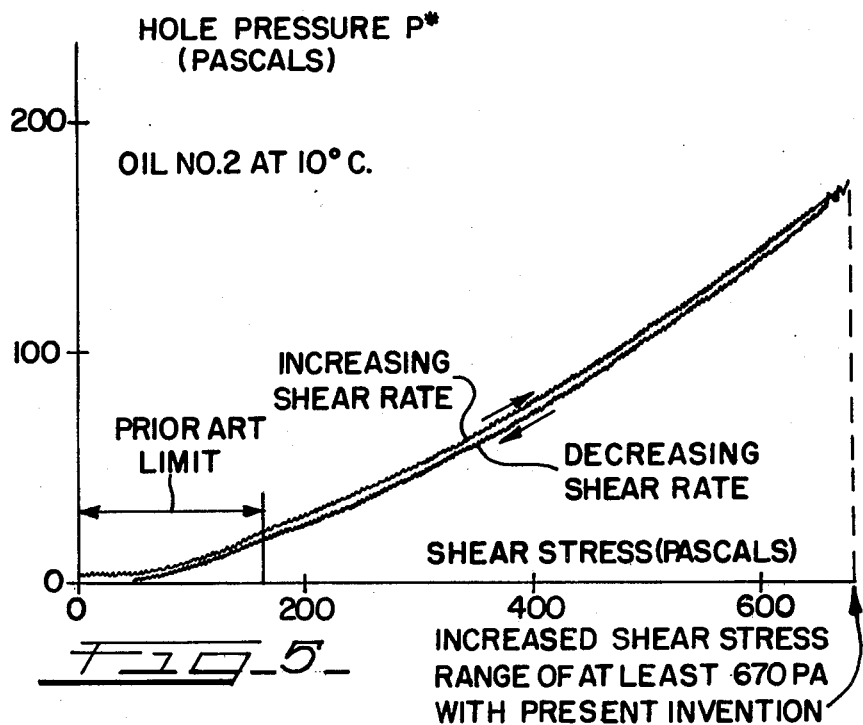

4,454,765

EXTENDED RANGE PRESSURE TRANSDUCERS

FIELD OF THE INVENTION

This invention relates to pressure transducers or devices for measuring or sensing fluid pressure.

BACKGROUND OF THE INVENTION

This invention is applicable to pressure transducers generally, but is particularly applicable to pressure transducers of the general construction disclosed and claimed in the applicant's U.S. Pat. No. 4,141,252, issued Feb. 27, 1979, and entitled "Flush Pressure Transducers for Measuring Pressures in a Flowing Fluid". A pressure transducer of this general construction comprises substantially flat diaphragm means forming a smooth continuous wall, to which fluid pressure is applied, a body backing up and supporting the diaphragm means, such body having an opening therein, the diaphragm means covering such opening and affording a flexible resilient diaphragm across such opening, and sensor means mounted in such opening for sensing the deflection of the diaphragm due to fluid pressure. The sensor means may be of the variable capacitance type, comprising a capacitative electrode spaced behind the diaphragm and supported on an insulator which is mounted in the opening in the transducer body.

While flush transducers of this type are highly effective and useful, it has been found that the fluid pressure causes slight bending of the transducer body, and that such bending introduces anomalies and inaccuracies, particularly at high fluid pressures. This factor imposes a limitation upon the useful pressure range of the pressure transducer. In some cases, the bending can be caused by counteracting fluid pressure introduced on the sensor side of the diaphragm.

OBJECTS OF THE INVENTION

One object of the present invention is to provide a new and improved pressure transducer having means for extending the pressure range of the transducer by overcoming anomalies and inaccuracies which result from bending of the transducer body due to fluid pressure.

A further object is to provide a new and improved pressure transducer having isolating means for isolating the pressure sensing components from the effects of bending of the transducer body.

SUMMARY OF THE INVENTION

To achieve these and other objects, the invention preferably provides a pressure measuring device, comprising substantially flat diaphragm means, a body backing up and supporting the diaphragm means, such body having an opening behind the diaphragm means, such diaphragm means covering the opening and affording a flexible resilient diaphragm extending across such opening, sensor means disposed in such opening behind the diaphragm for sensing any deflection of the diaphragm due to fluid pressure thereon, a mechanical isolating ring mounted in the opening behind the diaphragm, first connecting means between the body and the isolating ring, and second connecting means between the isolating ring and the sensor means for supporting the sensor means in an established relationship with the diaphragm, the first and second connecting means being of a character to hold the sensor means in an established relationship with the diaphragm, while being of a character to avoid transmitting bending moments whereby the isolating ring and the sensor means are isolated from bending moments which may be developed in the body due to the fluid pressure which is being measured.

Preferably, the isolating ring has an end surface flush with the body and engaging the diaphragm, and means for securing the diaphragm to the end surface of the isolating ring.

The first connecting means may comprise a shoulder on the body in the opening and facing away from the diaphragm, a portion on the isolating ring for engaging such shoulder, and screw threaded means or other suitable means between the body and the isolating ring for holding such portion of the isolating ring against the shoulder while avoiding the transmission of bending moments between the body and the isolating ring. The screw threaded means may comprise a retaining ring disposed in the opening behind the isolating ring, and mating screw threads on the retaining ring and the body whereby the retaining ring can be screwed into the opening against the isolating ring. In another construction, the screw threaded means may comprise a plurality of small machine screws extending between the isolating ring and the body.

The second connecting means may comprise screw threaded means between the isolating ring and the sensor means.

More specifically, the sensor means may include a sensor mounting member. Mating screw threads may be provided on the sensor supporting member and the isolating ring, whereby the sensor supporting member can be screwed into the isolating ring.

In another construction, the sensor supporting member may be retained in the isolating ring by resilient clamping means.

The sensor supporting member may take the form of an insulator which supports a capacitive electrode, spaced behind the diaphragm, so that deflection of the diaphragm varies the capacitance between the diaphragm and the electrode. Other types of sensors may also be employed.

BRIEF DESCRIPTION OF THE DRAWINGS

Further objects, advantages and features of the present invention will appear from the following description, taken with the accompanying drawings, in which:

FIG. 4 is a graph illustrating the anomalies which limit the useful range of prior art transducers.

FIG. 5 is a graph illustrating the extended range of pressure transducers constructed in accordance with the present invention.

DESCRIPTION OF ILLUSTRATIVE EMBODIMENTS

Figure 1:
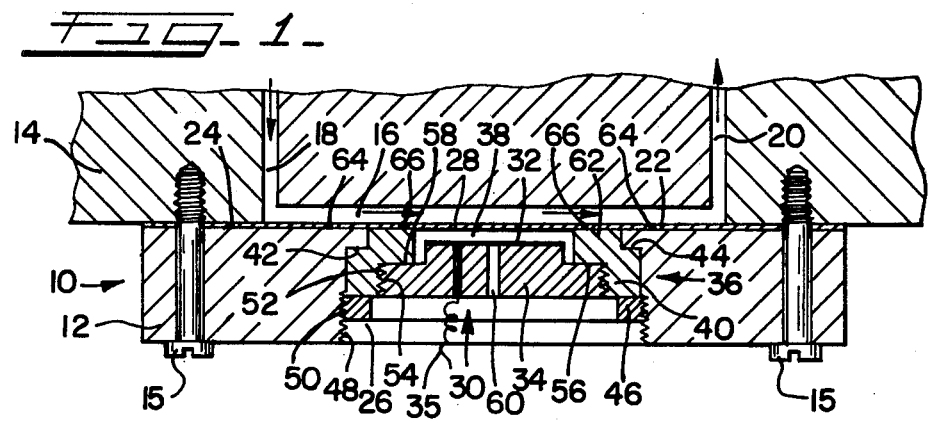
FIG. 1 is a diagrammatic sectional view showing a pressure transducer to be described as an illustrative embodiment of the present invention.

As just indicated, FIG. 1 illustrates a pressure measuring device or transducer 10, comprising a transducer body 12 which in this case is mounted on an apparatus body 14, by means of bolts 15 or the like, for measuring the pressure in a channel or space 16, formed between the bodies 12 and 14. The channel 16 is formed in the apparatus body 14, in this instance. A liquid or other fluid may flow into and out of the channel 16 through entrance and exit passages 18 and 20.

While the invention is applicable to pressure transducers generally, the pressure transducer 10 of FIG. 1 is of the flush type disclosed and claimed in the applicant's previously mentioned U.S. Pat. No. 4,141,252. Thus, the pressure transducer 10 comprises diaphragm means 22, forming a complete wall of the channel 16, without any interruption or step. Such diaphragm means 22 may preferably be made of thin sheet metal or foil, backed up by the transducer body 12 and secured across a flat surface 24 thereon. The diaphragm sheet 22 is preferably secured to the surface 24, as by welding or a suitable adhesive.

The illustrated transducer body 12 has an opening 26 therein. The diaphragm means or sheet 22 extends across and covers the upper end of the opening 26, thus forming a resiliently deflectable diaphragm 28 which is adapted to be deflected by the fluid pressure in the channel 16. The pressure transducer 10 is adapted to produce an electrical signal or indication, corresponding to such deflection of the diaphragm 28.

The pressure transducer 10 comprises sensor means 30, which may be of any known or suitable type, but is illustrated as being of the variable capacitance type. Thus, the sensor means 30 may comprise a capacitance electrode 32, spaced behind the diaphragm 28, so that deflection of the diaphragm varies the capacitance between the diaphragm 28 and the electrode 32. As shown, the electrode 32 is in the form of a thin layer or sheet, mounted on a sensor supporting member or insulator 34. The electrode 32 may be deposited as a coating on the insulator 34, or may be in the form of thin sheet metal or foil, bonded or adhesively secured to the insulator 34. An electrical lead 35 is electrically connected to the electrode 32, for connecting the electrode into an electrical circuit. The return side of the circuit may be connected to the metal diaphragm sheet 22 through the transducer body 12, which may also be made of metal.

The pressure transducer 10 of FIG. 1 is provided with isolating means 36 for isolating the sensor means 30 from the effects of bending of the transducer body 12 by the fluid pressure which is being measured. Such bending is slight, because the transducer body 12 has considerable strength and stiffness. Nevertheless, the bending of the transducer body 12 may be sufficiently great to affect the narrow gap 38 between the diaphragm 28 and the electrode 32, in the absence of the present invention.

As shown in FIG. 1, the isolating means 36 may comprise an isolating ring 40, interposed between the sensor means 30 and the transducer body 12. More specifically, the isolating ring 40 is interposed between the insulator or supporting member 34 and the transducer body 12.

The isolating ring or isolator 40 is adapted to hold the insulator 34 and the electrode 32 in an established relationship with the diaphragm 28. However, bending moments are not transmitted to any significant extent by the connecting means between the transducer body 12 and the isolating ring 40, such connecting means being of a character to avoid transmitting such bending moments. Thus, the connecting means between the transducer body 12 and the isolating ring 40, and also between the isolating ring 40 and the insulator 34 may be sufficiently firm to maintain the size of the gap 38, while being sufficiently weak to avoid the transmission of bending moments.

The connecting means between the transducer body 12 and the isolating ring 40 may include an internal shoulder or step 42 on the body 12, within the opening 26. The isolating ring 40 may have an external shoulder or stepped portion 44 which is engageable with the internal shoulder 42. As shown in FIG. 1, a retaining ring 46 is mounted in the opening 26 behind the isolating ring 40, to back up the ring 40 so as to hold the shoulder 44 against the shoulder 42. The transducer body 12 and the retaining ring 46 may have mating screw threads 48 and 50, so that the ring 46 can be screwed into the opening 26, to engage and retain the isolating ring 40. Other suitable means may be employed to retain the isolating ring 40.

The connecting means between the sensor supporting member or insulator 34 and the isolating ring 40 may include mating screw threads 52 and 54 on the insulator 34 and the ring 40, whereby the insulator 34 can be screwed into the ring 40. As shown in FIG. 1, the ring 40 is formed with an internal shoulder or step 56, adapted to be engaged by the insulator 34, which may have a shoulder or step 58, adapted to engage the shoulder 56.

The illustrated insulator 34 is provided with an opening or passage 60, through which a counteracting fluid pressure can be applied to the back of the diaphragm 28, in opposition to the fluid pressure which is being measured. It generally is advantageous to adjust the counteracting fluid pressure until it exactly balances or nullifies the fluid pressure to be measured, so that the deflection of the diaphragm 28 is nullified, as indicated by the sensor means 30. The counteracting fluid pressure can then be measured with any desired pressure gauge.

The isolating ring 40 preferably has a flat end surface 62 which engages the back of the diaphragm 28 and is exactly flush with the flat surface 24 on the transducer body 12. The diaphragm 28 is preferably secured to the flat end surface 62 of the isolating ring 40, as by welding, or by an adhesive bonding material or the like.

During the construction of the pressure transducer 10, the isolating ring 40 is inserted and held in the transducer body 12 by the retaining ring 46, before the diaphragm sheet 22 is installed on the body 12. The shoulder 44 on the ring 40 is held against the internal shoulder 42 on the body 12. The surface 24 on the body 12 and the end surface 62 on the isolating ring 40 are then machined and lapped flat to a very high precision, so that the end surface 62 on the ring 40 is exactly flush with the surface 24 on the body 12. The isolating ring 40 is never removed subsequently. The insulator 34 is then screwed into place in the isolating ring 40 and is machined, as needed, to establish the desired width of the gap 38 between the diaphragm 28 and the electrode 32. The diaphragm sheet 22 is then attached to the surfaces 24 and 62 on the body 12 and the isolating ring 40, as by means of welding, an adhesive bonding material, or the like. With this construction, the useful pressure range of the transducer 10 is extended to a much higher value of pressure than heretofore, because any bending of the transducer body 12, produced by such high pressure, does not significantly change the width of the gap 38 between the diaphragm 28 and the electrode 32. Even though bending may occur in the transducer body 12, bending moments are not transmitted to any significant extent to the isolating ring 40, because the connection between the body 12 and the isolating ring 40 is too weak to transmit bending moments to any significant extent, although such connection is sufficiently strong to maintain the relationship between the diaphragm 28 and the electrode 32.

In FIG. 1, the welding of the diaphragm sheet 22 to the flat surface 24 of the transducer body 12 is indicated by welds 64. The welding of the diaphragm sheet 22 to the flat end surface 62 of the isolating ring 40 is indicated by welds 66.

Figure 2:
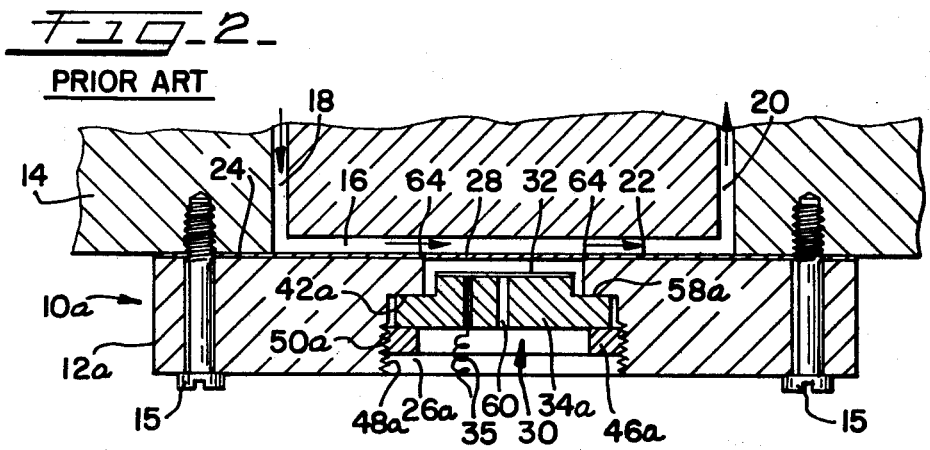
FIG. 2 is a diagrammatic section showing a prior art construction, for comparison with FIG. 1.

FIG. 2 shows a prior art construction, for comparison with the pressure transducer 10 of FIG. 1, described above as an embodiment of the present invention. The construction of FIG. 2 is of the general type disclosed and claimed in the applicant's U.S. Pat. No. 4,141,252, issued Feb. 27, 1979. To avoid unnecessary repetition of the description, the same reference characters have been employed in FIG. 2 to indicate components which are essentially the same as shown in FIG. 1. Similar components are indicated by the same reference characters followed by the letter "a". In this way, the description of FIG. 1 will be applicable to FIG. 2, except as indicated below.

Thus, FIG. 2 illustrates a pressure transducer 10a which differs from the transducer 10 in that the isolating ring 40 is not employed in the transducer 10a. The sensor supporting member or insulator 34a is mounted directly in the opening 26a in the transducer body 12a. The shoulder 58a on the insulator 34 engages the internal shoulder 42a on the transducer body 12. The retaining ring 46a screws into the opening 26a, into engagement with the insulator 34a, so as to hold the shoulder 58a against the internal shoulder 42a.

With the prior art transducer 10a of FIG. 2, high fluid pressure in the channel 16 causes a slight bending of the transducer body 12a, and such bending causes a small change in the width of the gap 38 between the diaphragm 28 and the capacitive electrode 32. This is true even though the fluid pressure in the channel 16 is exactly counterbalanced by the counteracting fluid pressure supplied to the gap 38 through the passage 60 in the insulator 34a.

Figure 3:
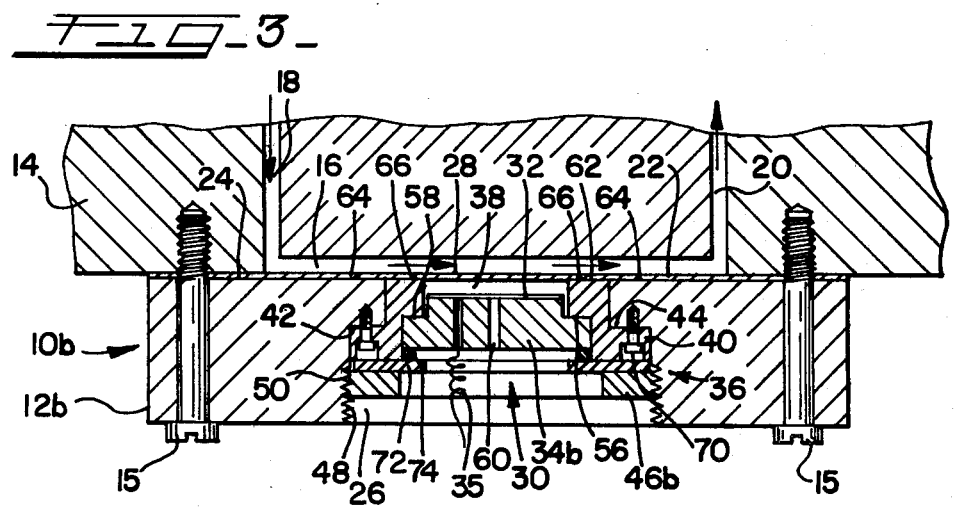
FIG. 3 is a diagrammatic section showing a modified pressure transducer, constituting another embodiment of the present invention.

FIG. 3 illustrates another embodiment of the present invention, in the form of a slightly modified pressure transducer 10b. To avoid unnecessary repetition of the description, the same reference characters have been employed in FIG. 3 to indicate components which are essentially the same as shown in FIG. 1. Similar components have been identified in FIG. 3 by the same reference characters with the addition of the letter "b". In this way, the description of FIG. 1 will be applicable to FIG. 3, except as indicated below.

The pressure transducer 10b of FIG. 3 differs from the transducer 10 in that there are differences in the connecting means between the isolating ring 40 and the transducer body 12b, and in the connecting means between the isolating ring 40 and the insulator 34b. In FIG. 1, the isolating ring 40 is held in the transducer body 12 by the screw threaded ring 46. In FIG. 3, the isolating ring 40 is held in the transducer body 12b by a plurality of small machine screws 70, extending between the isolating ring 40 and the transducer body 12b. The small machine screws 70 provide a sufficiently firm connection to maintain the relationship between the electrode 32 and the diaphragm 28, while affording a sufficiently weak connection to avoid the transmission of bending moments between the transducer body 12b and the isolating ring 40.

In FIG. 3, the insulator 34b is resiliently clamped against the isolating ring 40, so that the shoulder 58 on the insulator 34b is held against the internal shoulder 56 on the isolating ring 40. The resilient clamping of the insulator 34b is brought about by the screw threaded ring 46b, in conjunction with a washer 72 and a resiliently compressible "O" ring 74, made of rubber or similar material. The washer 72 and the resiliently compressible ring 74 are interposed between the threaded ring 46b and the insulator 34b and are compressed when the retaining ring 46b is screwed tightly into the internal threads 48 in the opening 26. The compression of the resilient ring 74 is sufficient to prevent any movement of the insulator 34b during use of the transducer 10b. Thus, the electrode 32 is maintained in the established relationship with the diaphragm 28. Nevertheless, bending moments are not transmitted to the insulator 34b to any significant extent.

The results and advantages of the present invention will be apparent from FIGS. 4 and 5, which are graphs to present a comparison between prior art data and data obtained with the aid of the present invention.

The graphs of FIGS. 4 and 5 represent data obtained with apparatus for measuring the hole pressure in a flowing non-Newtonian liquid. Such apparatus is disclosed and claimed in the applicant's U.S. Pat. No. 3,777,549, issued Dec. 11, 1973. Such apparatus, utilizing flush pressure transducers, is disclosed in the applicant's U.S. Pat. No. 4,141,252, issued Feb. 27, 1979. Generally speaking, the hole pressure is the difference between the flush pressure, measured flush with the wall of a passage in which a non-Newtonian liquid is flowing, and the pressure in a hole or recess, connecting with such passage, and at the same or an equivalent location along such passage. This pressure differential, referred to as the hole pressure, does not exist in ordinary or Newtonian liquids, which do not have shear elasticity to any significant extent, but does exist in flowing non-Newtonian liquids, which do have significant shear elasticity. Examples of non-Newtonian liquids include certain molten synthetic resinous plastic materials. The hole pressure is a useful indication of the degree of polymerization of certain synthetic resinous materials which are undergoing polymerization. This use of hole pressure measurements is cited by way of example only.

FIGS. 4 and 5 represent data in which the hole pressure was measured for different values of shear stress in the liquid. In each case, the hole pressure is plotted along the vertical axis, while the shear stress is plotted along the horizontal axis. The units involved in both the hole pressure and the shear stress are Pascals. One Pascal is equal to one Newton per square meter, which is equivalent to 10 dynes/cm$^2$.

FIG. 4 represents data obtained by the use of hole pressure measuring apparatus utilizing a prior art flush pressure transducer of the general construction exemplified by FIG. 2. The graph of FIG. 4 shows anomalous behaviour for shear stress values above approximately 160, in that there is a very noticeable drooping of the curves representing the plotted data, for both increasing shear rate and decreasing shear rate. The expected or correct curve is indicated in broken lines in FIG. 4. There is also a pronounced difference or hysteresis between the drooping portions of the curves for increasing shear rate and decreasing shear rate of FIG. 4. It is believed that these anomalies are due to the bending of the transducer body by the liquid pressure which is being measured. Because of these anomalies, the useful range of the shear stress for valid operation is limited to a maximum of about 160 Pascals.

FIG. 5 represents data obtained by the use of hole pressure measuring apparatus utilizing a flush pressure transducer in accordance with the present invention, as exemplified by FIGS. 1 and 3. It will be seen that the anomalies of FIG. 4 are absent from FIG. 5 and that the shear stress range has been increased from 160 to about 670 Pascals for this particular data. The hole pressure range has been increased from about 20 to about 175 Pascals.

FIGS. 4 and 5 represent data obtained with the same liquid, but at different temperatures, 21° C. for FIG. 4 and 10° C. for FIG. 5. Other tests show that the anomalies of FIG. 4 are not caused by this temperature difference, and that a similar temperature change for similar liquids has little effect on the curve of the hole pressure plotted against the shear stress. Since the same liquid was used in the tests represented by FIGS. 4 and 5, it was necessary to reduce the temperature of the liquid, for the test represented by FIG. 5, in order to attain the higher shear stress values, as represented by FIG. 5. In the tests represented by FIGS. 4 and 5, the same apparatus for measuring the hole pressure was used, except that the flush pressure transducer was changed, from the prior art transducer, represented by FIG. 4, to the flush pressure transducer in accordance with the present invention, for the test of FIG. 5.

In summary, the useful range of the disclosed pressure transducers is extended by isolating the sensing means of the transducer from bending moments produced in the transducer body by the fluid pressure being measured. The isolating means may comprise an isolating ring interposed between the body and the sensor means, disposed behind a diaphragm which is attached to the isolating ring and the body. The isolating ring is connected to the body by means adapted to hold the sensor means in an established relationship with the diaphragm while being of a character to avoid transmitting bending moments, whereby the isolating ring and the sensor means are isolated from bending moments developed in the body due to fluid pressure.

I claim:

1. A pressure measuring device, comprising substantially flat diaphragm means;

a body backing up and supporting said diaphragm means;

said body having an opening behind said diaphragm means;

said diaphragm means covering said opening and affording a flexible resilient diaphragm extending across said opening;

sensor means disposed in said opening behind said diaphragm for sensing any deflection of said diaphragm due to fluid pressure thereon;

a mechanical isolating ring mounted in said opening behind said diaphragm;

first connecting means between said body and said isolating ring;

and second connecting means between said isolating ring and said sensor means for supporting said sensor means in an established relationship with said diaphragm;

said first and second connecting means being of a character to hold said sensor means in an established relationship with said diaphragm while being of a character to avoid transmitting bending moments whereby said isolating ring and said sensor means are isolated from bending moments which may be developed in said body due to the fluid pressure which is being measured;

said first connecting means comprising a shoulder on said body in said opening and facing away from said diaphragm, a portion on said isolating ring for engaging said shoulder, and screw threaded means between said body and said isolating ring for holding said portion of said isolating ring against said shoulder while avoiding the transmission of bending moments between said body and said isolating ring, said screw threaded means comprising a plurality of small machine screws extending between said isolating ring and said body.

2. A pressure measuring device, comprising substantially flat diaphragm means, a body backing up and supporting said diaphragm means;

said body having an opening behind said diaphragm means;

said diaphragm means covering said opening and affording a flexible resilient diaphragm extending across said opening;

sensor means disposed in said opening behind said diaphragm for sensing any deflection of said diaphragm due to fluid pressure thereon;

a mechanical isolating ring mounted in said opening behind said diaphragm;

first connecting means between said body and said isolating ring;

and second connecting means between said isolating ring and said sensor means for supporting said sensor means in an established relationship with said diaphragm;

said first and second connecting means being of a character to hold said sensor means in an established relationship with said diaphragm while being of a character to avoid transmitting bending moments whereby said isolating ring and said sensor means are isolated from bending moments which may be developed in said body due to the fluid pressure which is being measured;

said sensor means including a sensor supporting member;

said second connecting means comprising an internal shoulder in said isolating ring and facing away from said diaphragm, and resilient clamping means for resiliently clamping said sensor supporting member against said internal shoulder.

3. A pressure measuring device, comprising substantially flat diaphragm means, a body backing up and supporting said diaphragm means;

said body having an opening behind said diaphragm means;

said diaphragm means covering said opening and affording a flexible resilient diaphragm extending across said opening;

sensor means disposed in said opening behind said diaphragm for sensing any deflection of said diaphragm due to fluid pressure thereon;

a mechanical isolating ring mounted in said opening behind said diaphragm;

said isolating ring having an end surface flush with said body and engaging said diaphragm;

means for securing said diaphragm to said end surface of said isolating ring;

first connecting means between said body and said isolating ring;

and second connecting means between said isolating ring and said sensor means for supporting said sensor means in an established relationship with said diaphragm;

said first and second connecting means being of a character to hold said sensor means in an established relationship with said diaphragm while being of a character to avoid transmitting bending moments whereby said isolating ring and said sensor means are isolated from bending moments which may be developed in said body due to the fluid pressure which is being measured;

said first connecting means comprising a shoulder on said body in said opening and facing away from said diaphragm;

said isolating ring having a portion thereon for engaging said shoulder;

and screw means between said isolating ring and said body for holding said portion of said isolating ring against said shoulder while avoiding the transmission of bending moments between said body and said isolating ring;

said sensor means including a sensor supporting member;

said second connecting means comprising an internal shoulder in said isolating ring and facing away from said diaphragm, and resilient clamping means for resiliently clamping said sensor supporting member against said internal shoulder.

4. A pressure measuring device according to claim 3, said resilient clamping means comprising a retaining ring received in said opening behind said isolating ring, mating screw threads on said retaining ring and said body whereby said retaining ring can be screwed into said body, and means including a resiliently compressible clamping ring compressed between said retaining ring and said sensor supporting member for resiliently clamping said supporting member against said internal shoulder.

5. A pressure measuring device, comprising substantially flat diaphragm means, a body having a substantially flat surface backing up and supporting said diaphragm means, said diaphragm means having a portion overlapping said flat surface and engaging said flat surface throughout substantially all of said portion, said body having an opening behind said diaphragm means, said diaphragm means covering said opening and affording a flexible resilient diaphragm extending across said opening, said diaphragm being substantially flat throughout its entire extent across said opening, sensor means disposed in said opening behind said diaphragm for sensing any deflection of said diaphragm due to fluid pressure thereon, an isolating ring mounted in said opening and interposed between said body and said sensor means for supporting said sensor means, said isolating ring having an opening therein, said sensor means including an electrical insulator extending through said opening in said isolating ring and retaining means for retaining said insulator in said last-mentioned opening, said body having an annular shoulder in said opening and facing away from said diaphragm, said isolating ring having a peripheral portion thereon for engaging said shoulder, and connecting means between said isolating ring and said body for holding said peripheral portion of said isolating ring in engagement with said shoulder to hold said sensor means in an established relationship with said diaphragm while avoiding the transmission of bending moments between said body and said isolating ring.

6. A pressure measuring device according to claim 5, said connecting means comprising screw threaded means between said body and said isolating ring for holding said peripheral portion of said isolating ring against said shoulder.

7. A pressure measuring device according to claim 5, said connecting means comprising a retaining ring disposed in said opening behind said isolating ring and having first screw threads on said retaining ring, and second screw threads on said body in said opening for receiving said first screw threads whereby said retaining ring can be screwed into said opening against said isolating ring.

8. A pressure measuring device according to claim 5, said connecting means comprising a plurality of fastening elements between said isolating ring and said body.

9. A pressure measuring device according to any of claims 5–7 and 8, including means for attaching said diaphragm to said isolating ring.

10. A pressure measuring device according to any of claims 5–7, 8 and 9, said retaining means comprising screw threaded means for securing said sensor means on said isolating ring.

11. A pressure measuring device according to any of claims 5–7 and 9, said retaining means including mating screw threads on said insulator and said isolating ring for removably securing said insulator on said isolating ring.

12. A pressure measuring device according to any of claims 5–7 and 9, said retaining means including mating screw threads on said sensor means and said isolating ring for securing said sensor means on said ring.

13. A pressure measuring device, comprising substantially flat diaphragm means, a body backing up and supporting said diaphragm means, said body having an opening behind said diaphragm means, said diaphragm means covering said opening and affording a flexible resilient diaphragm extending across said opening, said diaphragm being substantially flat throughout its entire extent across said opening, sensor means disposed in said opening behind said diaphragm for sensing any deflection of said diaphragm due to fluid pressure thereon, an isolating ring mounted in said opening and interposed between said body and said sensor means for supporting said sensor means, said isolating ring having an end surface for engaging said diaphragm, said body having an annular shoulder in said opening and facing away from said diaphragm, said isolating ring having a peripheral portion thereon for engaging said shoulder to position said isolating ring with said end surface engaging said diaphragm but without substantially deflecting said diaphragm, and connecting means between said isolating ring and said body for holding said peripheral portion of said isolating ring in engagement with said shoulder to hold said sensor means in an established relationship with said diaphragm while avoiding the transmission of bending moments between said body and said isolating ring.

14. A pressure measuring device according to claim 13, including means for securing said diaphragm to said end surface of said isolating ring.

15. A pressure measuring device according to claim 13 or 14, said connecting means including threaded means between said body and said isolating ring for holding said peripheral portion of said isolating ring against said shoulder.

16. A pressure measuring device according to claim 13 or 14, said connecting means comprising a plurality of small machine screws extending between said isolating ring and said body.

17. A pressure measuring device according to claim 13 or 14, said connecting means comprising a plurality of fastening elements for fastening said peripheral portion of said isolating ring to said shoulder.

18. A pressure measuring device according to claim 13 or 14, including screw threaded means for holding said sensor means on said isolating ring.

19. A pressure measuring device according to claim 13 or 14, said isolating ring including an internal shoulder facing away from said diaphragm, and resilient clamping means for resiliently clamping said sensor means against said last mentioned shoulder.

20. A pressure measuring device according to claim 19, said resilient clamping means including a resiliently compressible clamping ring for engaging said sensor means, a retaining ring received in said opening behind said isolating ring, and mating screw threads on said retaining ring and said body for removably securing said retaining ring in said opening for resiliently compressing said clamping ring against said sensor means.

21. A pressure measuring device according to claim 13 or 14, said connecting means comprising a retaining ring disposed in said opening behind said isolating ring, and mating screw threads on said retaining ring and said body for removably clamping said retaining ring against said peripheral portion of said isolating ring.

22. A pressure measuring device according to claim 13 or 14, including mating screw threads on said sensor means and said isolating ring for securing said sensor means on said isolating ring.

23. A pressure measuring device, comprising substantially flat diaphragm means, a body backing up and supporting said diaphragm means, said body having an opening behind said diaphragm means, said diaphragm means covering said opening and affording a flexible resilient diaphragm extending across said opening, said diaphragm being substantially flat throughout its entire extent across said opening, sensor means disposed in said opening behind said diaphragm for sensing any deflection of said diaphragm due to fluid pressure thereon, an isolating ring mounted in said opening and interposed between said body and said sensor means for supporting said sensor means, said body having an annular shoulder in said opening and facing away from said diaphragm, said isolating ring having a peripheral portion thereon for engaging said shoulder, and connecting means between said isolating ring and said body for holding said peripheral portion of said isolating ring in engagement with said shoulder to hold said sensor means in an established relationship with said diaphragm while avoiding the transmission of bending moments between said body and said isolating ring, said connecting means comprising a plurality of small machine screws extending between said isolating ring and said body.

24. A pressure measuring device, comprising substantially flat diaphragm means, a body backing up and supporting said diaphragm means, said body having an opening behind said diaphragm means, said diaphragm means covering said opening and affording a flexible resilient diaphragm extending across said opening, said diaphragm being substantially flat throughout its entire extent across said opening, sensor means disposed in said opening behind said diaphragm for sensing any deflection of said diaphragm due to fluid pressure thereon, an isolating ring mounted in said opening and interposed between said body and said sensor means for supporting said sensor means, said body having an annular shoulder in said opening and facing away from said diaphragm, said isolating ring having a peripheral portion thereon for engaging said shoulder, and connecting means between said isolating ring and said body for holding said peripheral portion of said isolating ring in engagement with said shoulder to hold said sensor means in an established relationship with said diaphragm while avoiding the transmission of bending moments between said body and said isolating ring, said sensor means including a sensor mounting member, said isolating ring having an internal shoulder therein facing away from said diaphragm, and resilient clamping means for resiliently clamping said sensor supporting member against said last mentioned shoulder.

25. A pressure measuring device according to claim 24, said resilient clamping means comprising a resiliently compressible clamping ring engaging said sensor supporting member, and a retaining ring received in said opening behind said isolating ring for compressing said clamping ring against said sensor supporting member, said retaining ring and said body having mating screw threads thereon whereby said retaining ring can be screwed into said opening.

* * * * *